Oct. 24, 1939.   S. W. E. ANDERSSON   2,177,380
REGULATOR FOR REFRIGERATING APPARATUS
Filed June 2, 1934   4 Sheets-Sheet 1

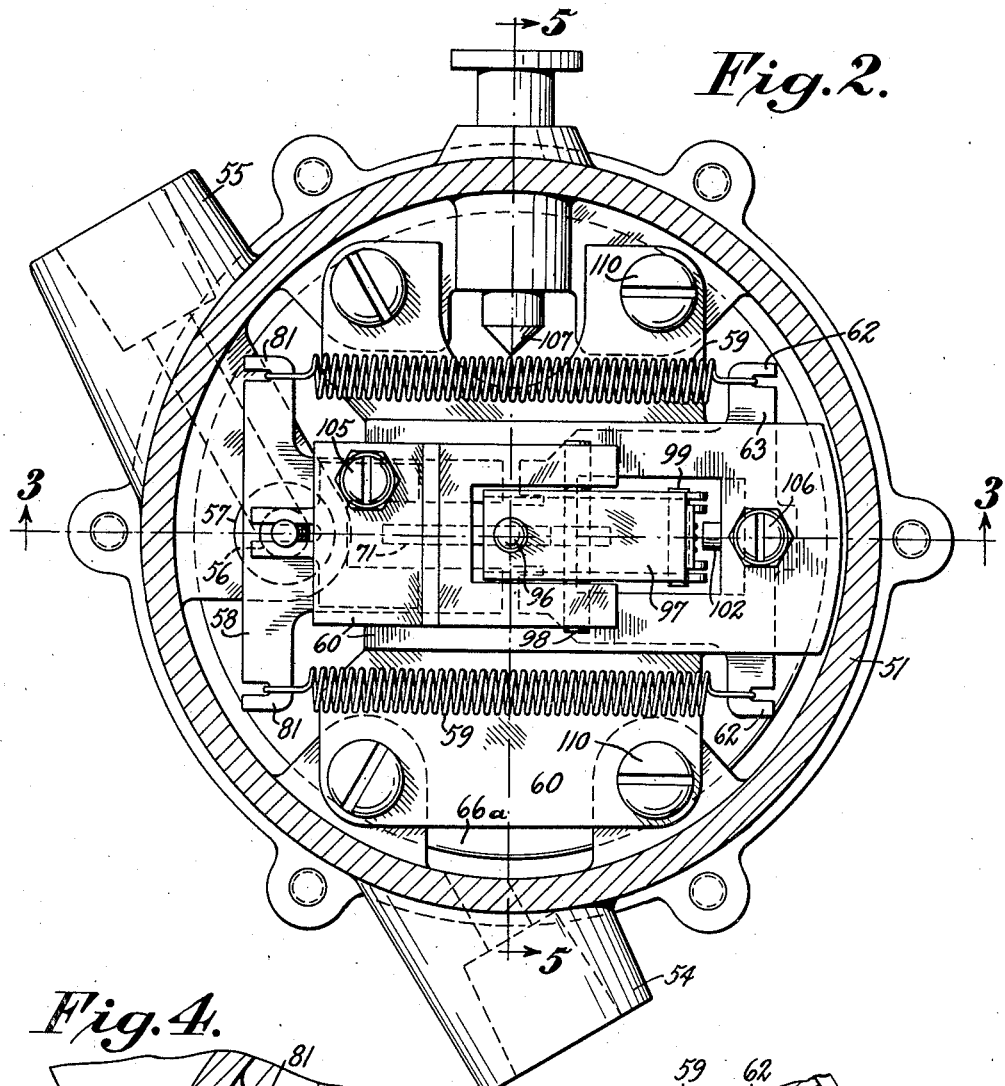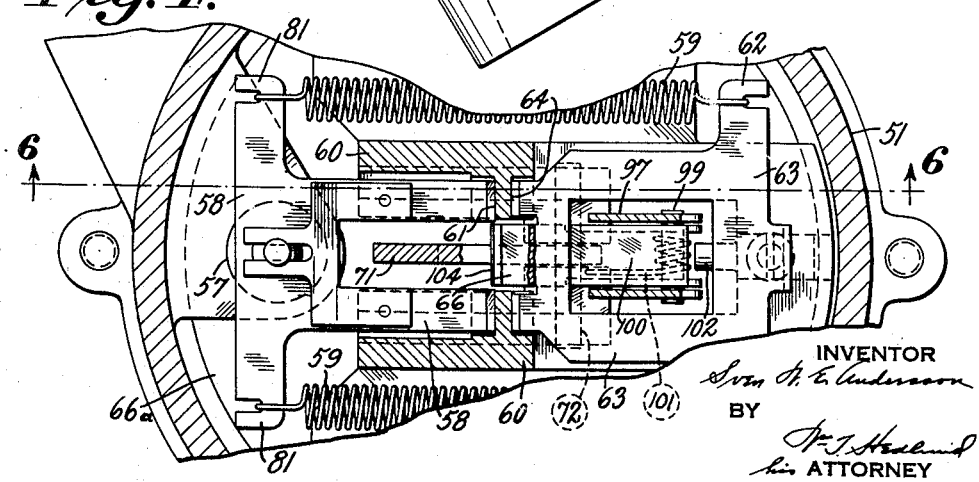

Oct. 24, 1939.  S. W. E. ANDERSSON  2,177,380

REGULATOR FOR REFRIGERATING APPARATUS

Filed June 2, 1934  4 Sheets-Sheet 4

Patented Oct. 24, 1939

2,177,380

UNITED STATES PATENT OFFICE 2,177,380

REGULATOR FOR REFRIGERATING APPARATUS

Sven W. E. Andersson, Evansville, Ind., assignor, by mesne assignments, to Servel, Inc., Dover, Del., a corporation of Delaware Application June 2, 1934, Serial No. 728,670

11 Claims. (Cl. 236—99)

My invention relates to control apparatus for refrigerating systems.

The object of my invention is to provide a reliable control mechanism for controlling the heat supply of an intermittent refrigeration system and more particularly a control mechanism for a refrigerating system of the type disclosed in the application of Carl Georg Munters, Serial No. 701,123 filed Dec. 6, 1933 (Patent No. 2,027,057 of January 7, 1936).

The invention will be understood from the following description of a preferred form thereof taken in conjunction with the accompanying drawings, forming a part of this specification, and of which:

Fig. 2 is a horizontal sectional view of my novel regulator taken on the line 2—2 of Fig. 3;

Fig. 4 is a horizontal sectional view taken on the line 4—4 of Fig. 3;

Figure 1:
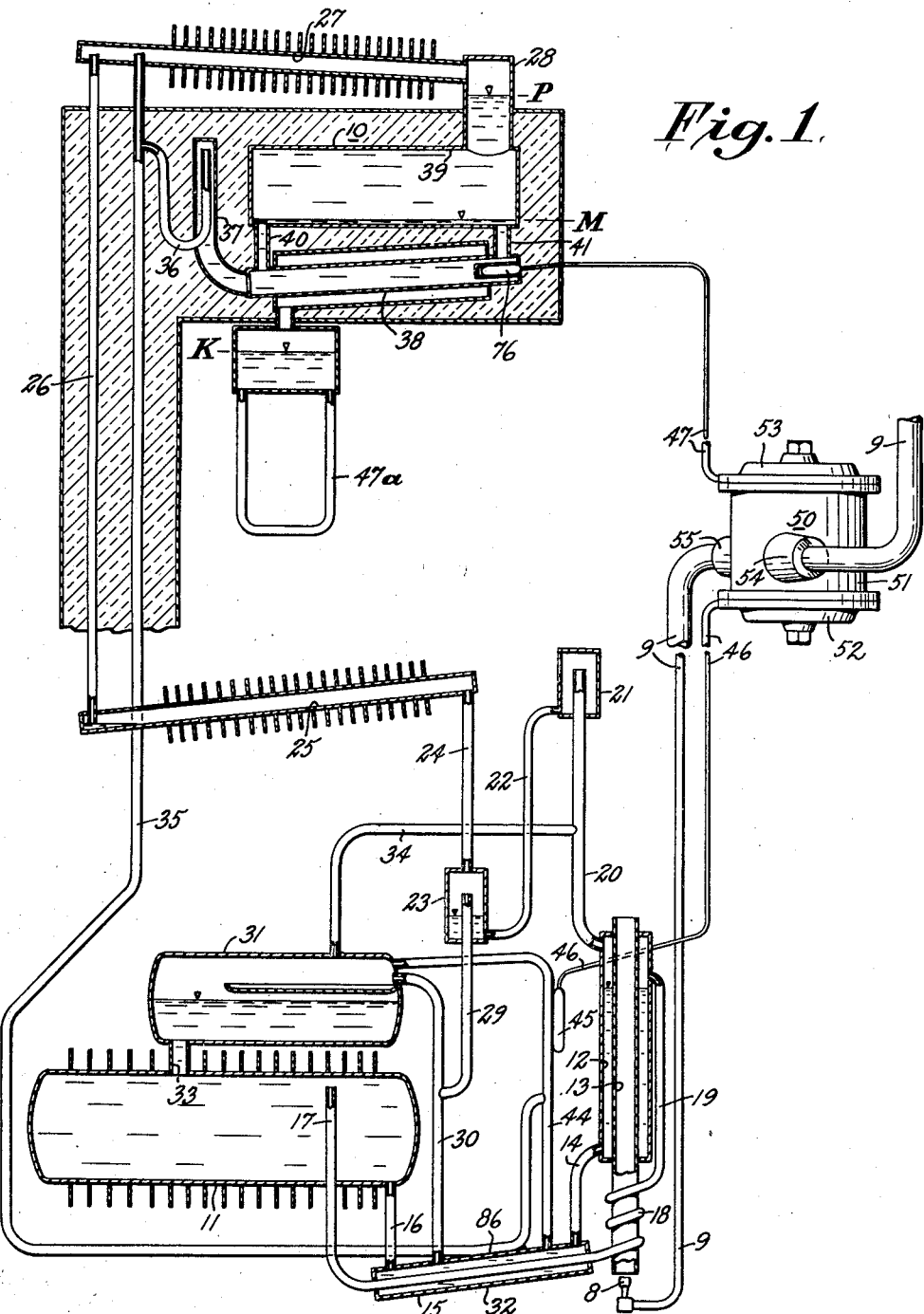
Fig. 1 shows my control mechanism associated with one form of refrigerating apparatus.

In order to demonstrate the function of my regulator I have shown it applied to a refrigerating system in Fig. 1, although the refrigerating system per se is no part of the present invention. The refrigerating system includes an absorption liquid reservoir 11 exposed to the cooling effect of atmospheric air. This reservoir is filled with a solution of refrigerant in absorbent, which may be ammonia dissolved in water as absorption liquid. To one side of the reservoir 11 is a generator 12 which may be heated by any suitable source, as a gas flame or an electric heater. I have shown a gas supply line 9 having at the end thereof a burner 8 for projecting a flame into the flue 13 extending through the generator. Conduits 14, 15 and 16 connect the lower part of the generator 12 with the lower part of vessel 11. A conduit 17 connects the upper part of vessel 11 with a thermosyphon coil 18 disposed to receive heat, as by being wound around flue 13 in contact therewith. The upper part of coil 18 is connected to the upper part of the generator by means of conduit 19. The upper part of the generator is connected by means of a conduit 20 with the upper part of vessel 21, the lower part of which is, in turn, connected by a trap conduit 22 with a lower vessel 23. A conduit 24 connects the upper part of vessel 23 with the top part of a condenser 25 which may be exposed to the cooling influence of surrounding air. The condenser as well as the absorber-reservoir may be provided with cooling fins as indicated in the drawings. The lower part of the condenser 25 is connected by means of the vertical pipe 26 with the upper part of a second condenser 27 which is situated above an evaporator 10, and which is connected to a dome 28 of the evaporator 10.

Extending upwardly within vessel 23 is a conduit 29 which is connected to conduit 30. Conduit 30 connects conduit 15 with the upper part of a volume variation vessel 31. Conduits 15 and 17 pass in heat exchange relation as shown at 32. A conduit 33 extends between reservoir 11 and volume variation vessel 31. A conduit 34 connects the upper part of the volume variation vessel 31 with the conduit 20. A drain conduit 36 is connected at the top to condenser 27 and at the bottom to a conduit 44 which extends between conduit 15 and the upper part of vessel 31. A portion of conduit 35 is in heat exchange relation with conduit 15 at 86. Connected to the conduit 35 is a U-tube 36 which opens within a conduit 37 closed at the top and communicating at the bottom with a low liquid containing part or header 38 of the evaporator 10. The upper part of the evaporator which may be designated as 39 is connected to the lower header 38 by means of two vertical pipes 40 and 41.

A vaporization-condensation member 47a has an upper condenser portion in heat transfer relation with evaporator 10 and a lower evaporation portion in heat exchange relation with the body or space to be refrigerated.

The system operates with alternate periods of absorption and expulsion. During the expulsion period, heat is supplied to the generator 12 and the thermosyphon coil 18. By this means a circulation is set up between the generator 12 and the reservoir 11. Strong absorption liquid flows from vessel 11 through conduit 17 and into the thermosyphon coil 18, where refrigerant vapor is expelled from solution and produces a lifting effect on the liquid. The vapor and liquid pass upwardly into the generator 12. In the generator 12, further vapor is driven from solution due to heating the same, and the weak solution flows downwardly therein and passes through conduits 14, 15 and 16 to the vessel 11. The vessel 11 is filled with liquid and the weak liquid is admitted at the bottom and the strong liquid withdrawn from the top so that there is a progressive rise of quantity of weak liquid upward in vessel 11.

Vapor expelled in the coil 18 and vessel 12 passes through conduit 20, through conduits 22 and 24 and into condenser 25 where most of it is liquefied. Liquid is contained within the vessel 31 and this vessel may be insulated or somewhat heated and provides a stagnant layer of liquid over the main body of absorption liquid so that a pool of concentrated solution is formed in communication with the generator through conduit 34 during the expulsion periods, which prevents substantial absorption of refrigerant vapor. No flow takes place through conduit 30 at this time. The liquid condensed in condenser 25, together with some gas, is forced, due to the pressure in the hot part of the system, through pipe 26 into the condenser 27 where any remaining vapor is condensed. The condensed liquid falls down into the evaporator 10 and accumulates there. When the evaporator has filled up to a certain level, which level should be within the dome 28, liquid overflows through the drain bend 36 and conduit 35 and into the liquid portion of the system. When a certain amount of pure liquid refrigerant has overflowed through the pipe 35 so that pure ammonia becomes heated in the portion 86 of conduit 35 which is in heat exchange relation with conduit 15, vapor is formed which rises upwardly and enters conduit 44. The entrance of vapor into conduit 44 causes an upward movement of liquid therein. This is warm liquid drawn from the liquid heat exchanger or other suitable warm portion of the system. The upward flow of warm liquid and gas in conduit 44 causes the heating of a bulb 45 which is connected by tube 46 to the regulator 50. The heating of bulb 45 causes operation of the regulator to shut off the supply of gas through conduit 9 as shall presently be explained.

When the heat supply to the generator is cut off, the generator cools, causing liquid to be drawn up into the seal or trap conduit 22. Vapor above the liquid in the generator is absorbed by absorption liquid as the cooling takes place. The rate of absorption may be enhanced by separate pools of absorption liquid or by other means. The lower pressure in the generator relative to the evaporator causes liquid to be lowered in tube 29 until gas can enter tube 30 through conduit 29. This sets up a circulation of liquid upwardly in conduit 30 due to the entrance of gas thereinto through conduit 29 from the evaporator. The liquid flows downwardly through vessels 31 and 11 and through conduits 16 and 15 back to conduit 30. The conduit 34 affords a direct communication between the cold absorption liquid and the generator whereby the absorption of vapors above the liquid in the generator is accelerated.

The absorption period is now under way and the refrigerant in evaporator 10 is evaporated and takes up heat, thus producing cold. The cold produced in evaporator 10 causes condensation and evaporation in member 47a whereby heat is removed from and cold is produced in the body to be cooled. A bulb 76 is in heat exchange relation with the evaporator 10 and is connected by means of a tube 47 to the regulator 50. The rise of the evaporator temperature to a predetermined value during the absorption period causes re-opening of the regulator valve to allow gas to be again supplied to the generator.

Figure 6:
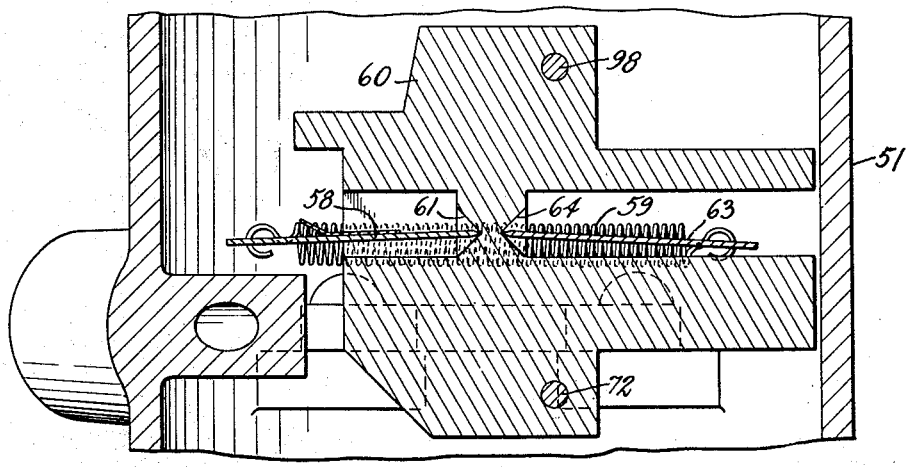
Fig. 6 is a vertical sectional view taken on the line 6—6 of Fig. 4.

The regulator 50 of the present invention comprises a casing member 51 having a bottom plate 52 and a top plate 53. Casing member 51 is provided with a boss 54 connected to the gas supply conduit 9 on the gas supply side and a boss 55 connected to that portion of conduit 9 which is connected to the burner 8. The passage through boss 55 ends in a valve opening 56 controlled by a valve 57 mounted on rocker arm 58. Rocker arm 58 is held by two tension springs 59 against a central fixed member or part 60 in a V-groove 61 therein. The inner end of arm 58 is of knife edge form to pivot in the bottom of the groove. The two springs 59 extend between ears 81 on the rocker arm 58 and ears 62 on an oppositely disposed rocker arm 63. The springs 59 pull the rocker arm 63 a V-groove 64 on the opposite side of the part 60 from the groove 61. Rocker arm 63 likewise has a pointed inner edge to pivotally seat in the groove 64. The rocker arm 63 is provided with upper and lower projections 65 and 66 respectively. The parts 58 and 63 and the interconnecting springs 59 together with the support and actuating means therefor constitute a snap action mechanism. If the rocker arm 63 is swung upwardly from the position shown in Fig. 6 so that the springs are carried beyond dead center represented by the alignment of the bottom of grooves 61 and 64 and the places where the springs are secured to the rocker arms, then the rocker arm 58 is snapped upwardly to open the valve composed of the valve member 57 and the valve orifice 56. If the rocker arm 63 is swung downwardly so that the springs are carried past dead center, the rocker arm 58 is pulled downwardly. It will be understood that the bottoms of grooves 61 and 64 lie between the planes of the axes of the springs in up and down positions.

Situated in the lower part of the casing is a fluid thermostat member 66a formed by diaphragms soldered together and providing an expansible chamber 67. This chamber 67 is connected through passage 68 in block 69 with tube 46 connected to bulb 45. Cover 52 is notched to provide an aperture for passage therethrough of tube 46. A gas tight diaphragm 82 is provided between the space 83 within cover 52 and the space 84 within part 51. An adjusting screw 70 is provided for regulating the thermostat element formed by the bulb 45, the tube 46, and the members forming the expansible chamber 67.

A lever 71 is pivotally mounted at 72 on the fixed center member 60 which is secured to lugs on casing member 51 by screws 110. Lever 71 is bent as shown and has a projection 73 at the top over which fits a spring 74. Lever 71 is notched at 75 and the projection 65 of rocker arm 63 is adapted to enter the notch and to be engaged by the lever 71.

In the upper part of the regulator casing is a fluid thermostat member 90 formed by diaphragms soldered together and forming an expansible chamber 91. This chamber is connected through passage 92 in block 93 with the tube 47 connected to bulb 76. An adjusting screw 94 is provided for regulating this thermostatic element. A gas tight diaphragm 95 is likewise provided at this end of the regulator.

The expansible member 90 bears against a stud 96 mounted on a lever 97 pivoted on pin 98 mounted on fixed member 60. Lever 97 is of inverted U-shape. Spring 74 extends over stud 96 and acts between levers 71 and 97.

At the bottom of lever 97 is a pin 99. This pin is not mounted on member 60 but is free to move with lever 97 in an inside space of member 60. Mounted on pin 99 is a catch member 100. A spring 101 is wrapped around pin 99 and engages lever 97 and urges catch member 100 upwardly.

Figure 3:
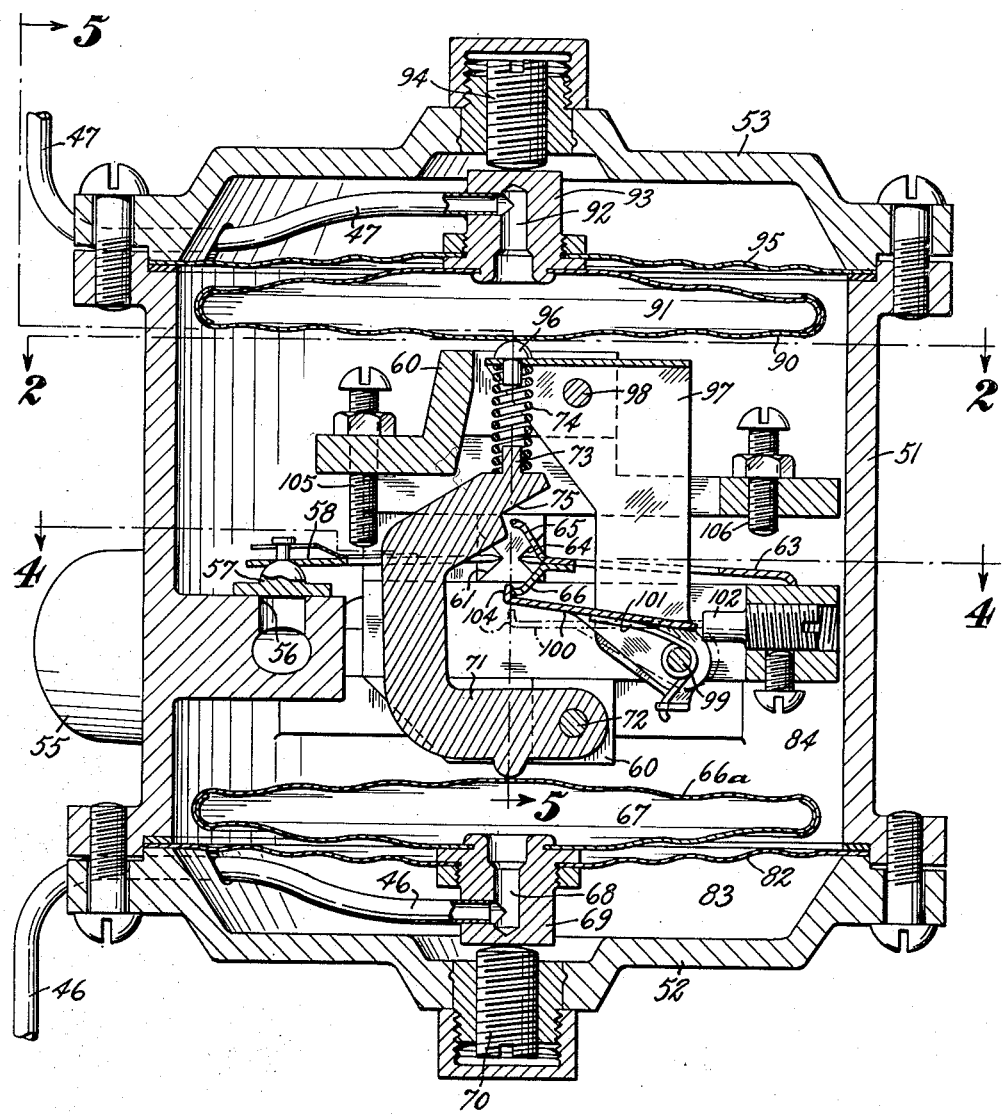
Fig. 3 is a vertical sectional view taken on the line 3—3 of Fig. 2, part being omitted for clarity.
Figure 5:
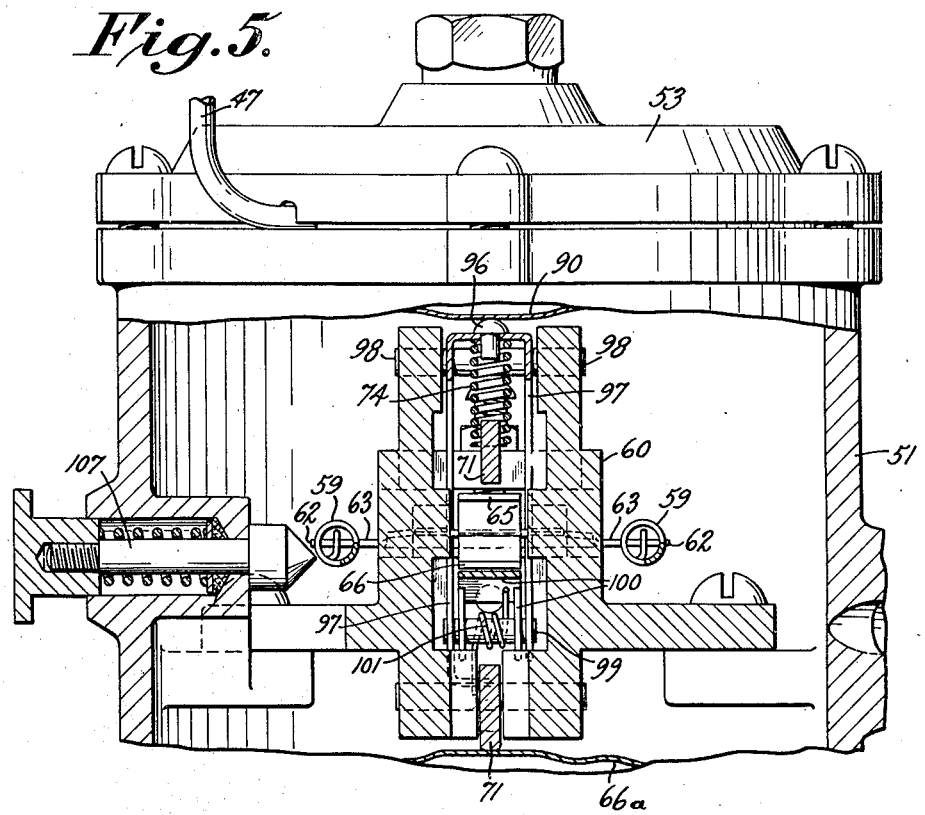
Fig. 5 is a vertical sectional view (partly in elevation) taken on the line 5—5 of Fig. 2.

A fixed adjustable abutment 102 is mounted on fixed member 60 and is positioned so that when lever 97 is moved in a counter-clockwise direction, as seen in Fig. 3, the right end of catch member 100 engages the abutment and this catch member 100 is turned in counterclockwise direction away from rocker arm 63. Catch member 100 has a lip 104 adapted to slip over and engage projection 66 to pull projection 66 to the right, as seen in Fig. 3, when lever 97 is rocked in counter-clockwise direction. Adjustable fixed abutments 105 and 106 limit upward movement of rocker arms 58 and 63.

A plunger 107 is mounted in the side of the casing in a gas tight boss and has a tapered end adapted to engage the under side of one of the springs 59 to lift the same and cause opening of the valve. This is for use in starting or restarting the apparatus.

A by-pass is provided around or through the regulator for a continuously burning pilot flame. Instead of operating a gas valve, rocker arm 58 may operate an electric switch.

In operation, assume that the heating or generating period is in progress. The liquid refrigerant accumulates in the evaporator 10 to the point where overflow takes place through the conduit 35. When pure ammonia flows through this conduit, this pure ammonia is vaporized in the part 86 of this conduit which is in heat exchange relation with conduit 15 and the vapor passes upwardly and into conduit 44. This causes a thermosyphon flow of hot fluid upwardly through conduit 44 and into heat exchange relation with bulb 45. Heating of bulb 45 to a temperature of, for example, 150° F., causes vaporization of fluid therein, which may be ether. The vaporization produces an increase of pressure in chamber 67 and the member 66a is expanded as a result of which lever 71 is turned on its pivot 72 in clockwise direction, as shown in Fig. 3, and engages projection 65. Further movement causes a clockwise turning of rocker arm 63 and when the snap action mechanism is carried beyond dead center position the rocker arm 58 is snapped downwardly and the gas valve 57 is closed. The absorption period is now under way as previously explained, and the evaporator 10 becomes cold. The cooling of the evaporator causes contraction of fluid within the thermostat bulb 76, tube 47 and chamber 91. This permits the spring 74 to urge lever 97 in clockwise direction whereby the lower part of lever 97 is moved to the left, as shown in Fig. 3. Catch 100 is thus released from the abutment 102 and is urged upwardly by spring 101 and passes over and engages projection 66 in the position shown in full lines in Fig. 3. The catch member 100 may move still further to the left, but all of this movement toward the left has no effect on the gas valve, which remains in closed position. The absorption period continues with the production of low temperature in evaporator 10 and after a lapse of time the ability of the refrigerant to evaporate is reduced and, due to supply of heat to the member 47a and evaporator 10, the temperature of evaporator 10 rises. In the meanwhile the bulb 45 has cooled off and the contraction of chamber 67 results in movement of lever 71 away from projection 65. Upon rise of evaporator temperature to, for example, 20° F., lever 97 is now moved in counter-clockwise direction so that the lip 104 on catch 100 engages the projection 66. On further expansion of chamber 91 the projection 66 is moved to the right, as shown in Fig. 3, and the rocker arm 63 is thus swung upwardly in counter-clockwise direction. When this upward movement of rocker arm 63 carries the springs 59 beyond the alignment of the grooves 61 and 64 with the ends of the springs, snap action results and rocker arm 58 is suddenly elevated, thus opening the gas valve. This restarts the heating period by supplying gas to the burner 8. Upon further rise of temperature above that at which the valve is snapped open, catch 100 engages abutment 102 and is moved out of the path of movement of projection 66, the abutment being adjusted accordingly.

It will be understood that the invention is not limited to the embodiment described and shown in the drawings, and that various modifications may be made within the spirit and scope of the invention.

What I claim is:

1. In a control device for an intermittent refrigeration system, a valve, snap-action mechanism for opening and closing said valve, a first temperature-responsive element, means operable on movement of said temperature-responsive element in one direction to throw said snap-action mechanism, a spring biased operating element for reversing the throw of the snap-action mechanism, a second temperature-responsive element, and means for inter-relating the spring biased operating element to the snap-action mechanism on movement of said second temperature-responsive element in one direction and for actuating the spring biased operating element to reverse the snap-action mechanism on movement of said second temperature-responsive element in the opposite direction, said snap-action mechanism having two projections, said first-mentioned means engaging one of said projections to exert force thereagainst in one direction on movement of said first temperature-responsive element, said spring-biased operating element engaging the other projection to exert a force thereagainst in the same direction on movement of the second temperature-responsive element.

2. In a control device for an intermittent refrigeration system, a valve, snap-action mechanism for opening and closing said valve, a first temperature-responsive element, means operable on movement of said temperature-responsive element in one direction to throw said snap-action mechanism, a spring biased operating element for reversing the throw of the snap-action mechanism, a second temperature-responsive element, means for inter-relating the spring biased operating element to the snap-action mechanism on movement of said second temperature-responsive element in one direction and for actuating the spring biased operating element to reverse the snap-action mechanism on movement of said second temperature-responsive element in the opposite direction, and an abutment against which the last-mentioned means moves the spring-biased operating element to swing such element away from the snap-action mechanism against the action of the spring.

3. In a control device for an intermittent refrigeration system, a valve, snap-action mechanism for opening and closing said valve, a first expansible member, a lever actuatable by expansion of said expansible member and movable in one direction to contact and throw said snap-action mechanism, a second expansible member, a second lever turnable by said second expansible member, and at catch mounted on said second lever and adapted to engage said snap-action mechanism, said catch being movable in said one direction upon expansion of said second expansible member to throw said snap-action mechanism.

4. In a control device for an intermittent refrigeration system, a valve, snap-action mechanism for opening and closing said valve, a first expansible member, a lever actuatable by expansion of said expansible member and movable in one direction to contact and throw said snap-action mechanism, a second expansible member, a second lever turnable by said second expansible member, a catch mounted on said second lever and adapted to engage said snap-action mechanism said catch being movable in said one direction upon expansion of said second expansible member to throw said snap-action mechanism, and an abutment, said catch being turnably mounted on said second lever and being spring pressed in a given direction and moved in the opposite direction by contact with said abutment.

5. In a control device for an intermittent refrigeration system, a valve, snap-action mechanism for opening and closing said valve, a plurality of temperature-responsive elements, means actuated by one temperature-responsive element and including a member movable in one direction to push the snap-action mechanism from a first position over dead center to a second position, and means actuated by the other temperature-responsive element and including a member movable in said one direction to pull the snap-action mechanism from the second position over dead center to the first position.

6. In a control device for an intermittent refrigeration system, a valve, a snap-action mechanism for opening and closing said valve, a plurality of temperature-responsive elements, means actuated by one temperature-responsive element and including a member movable in one direction to push the snap-action mechanism from a first position over dead center to a second position, and means actuated by the other temperature-responsive element and including a member movable in said one direction to pull the snap-action mechanism from the second position over dead center to the first position and including a turnable member and a catch turnably mounted on the turnable member.

7. In a control device for a gas heated intermittent refrigeration system, an annular casing having gas inlet and outlet openings, a resilient diaphragm at each end of said casing to form a gas-tight chamber, an expansible thermostat element located at each end of said casing and mounted on one of said diaphragms, closure members for said casing fitting over said diaphragms, a valve in said casing for controlling flow of gas therethrough, snap-action means disposed within said casing between said thermostat elements and arranged to operate said valve, and mechanism cooperating with said snap-action means for moving the latter in one direction to open said valve upon expansion of one of said thermostat elements and for moving said snap-action means in an opposite direction to close said valve upon expansion of the other of said thermostat elements, and a movable member in each of said closure members for independently adjusting said resilient diaphragms and thermostat elements mounted thereon to determine the operation of said snap-action means and hence the movements thereof to open and close said valve.

8. In a control device for a gas heated intermittent refrigeration system, a gas-tight annular casing having gas inlet and outlet openings, a valve in said casing for controlling flow of gas therethrough, an expansible thermostat element located at each end of said casing, a snap-action toggle disposed within said casing between said thermostat elements and arranged to operate said valve, and mechanism cooperating with said toggle for moving the latter in one direction to open said valve upon expansion of one of said thermostat elements and for moving said toggle mechanism in an opposite direction to close said valve upon expansion of the other of said thermostat elements.

9. In a control device for a gas heated intermittent refrigeration system, a gas-tight annular casing having gas inlet and outlet openings, a valve in said casing for controlling flow of gas therethrough, two expansible thermostat elements located at opposite sides of said valve and substantially in line with each other within said casing, a snap-action toggle disposed within said casing between said thermostat elements and arranged to operate said valve, and mechanism cooperating with said toggle for moving the latter in one direction to open said valve upon expansion of one of said thermostat elements and for moving said toggle in an opposite direction to close said valve upon expansion of the other of said thermostat elements.

10. In a control device for an intermittent refrigeration system, a control member for controlling the energy supply to said refrigeration system, a snap-action mechanism to operate said control member, two expansible elements, and mechanism operatively associated with said expansible elements and including two members cooperating with said snap-action mechanism to move the latter to operate said control member, one of said members being movable in one direction upon expansion of one of the expansible elements to actuate said snap-action mechanism and the other of said members being movable in the same direction upon expansion of the other of the expansible elements to actuate said snap-action mechanism.

11. In a control device for a gas heated intermittent refrigeration system, a gas-tight annular casing having gas inlet and outlet openings, a valve in said casing for controlling flow of gas therethrough, two expansible and contractible elements located at opposite sides of said valve and substantially in line with each other in said casing, means including a member disposed within said casing between said expansible and contractible elements and arranged to operate said valve, and mechanism cooperating with said member for moving the latter in one direction to open said valve upon expansion of one of said elements and for moving said member in an opposite direction to close said valve upon expansion of the other of said elements.

SVEN W. E. ANDERSSON.